United States Patent [19]

Falk

[11] 4,117,681
[45] Oct. 3, 1978

[54] TANDEM MASTER CYLINDER WITH INTEGRAL PROPORTIONING VALVE

[75] Inventor: Edward J. Falk, St. Louis, Mo.

[73] Assignee: Wagner Electric Corporation, St. Louis, Mo.

[21] Appl. No.: 765,885

[22] Filed: Feb. 7, 1977

[51] Int. Cl.² .......................................... B60T 11/20
[52] U.S. Cl. ....................................... 60/562; 60/555;
         60/579; 60/591; 303/6 C
[58] Field of Search ................. 60/562, 591, 581, 555,
         60/561, 579; 303/6 C

[56] References Cited

U.S. PATENT DOCUMENTS

| 3,143,860 | 8/1964 | Stelzer | 60/562 |
| 3,308,620 | 3/1967 | Melinat | 303/6 C |
| 3,462,200 | 8/1969 | Lewis | 60/562 |
| 3,669,507 | 6/1972 | Stokes | 303/6 C |
| 3,712,057 | 1/1973 | Aiki | 303/6 C |
| 3,760,841 | 9/1973 | Daffron | 303/6 C |
| 4,028,658 | 6/1977 | Nakamura | 303/6 C |

*Primary Examiner*—Martin P. Schwadron
*Assistant Examiner*—Abraham Hershkovitz
*Attorney, Agent, or Firm*—Eyre, Mann, Lucas & Just

[57] ABSTRACT

A tandem brake master cylinder has a proportioning valve between two pressure regions therein. The pressure in a second pressure region changes by a proportion of the change in a first pressure region at least over a part of the pressure range of the first pressure region.

8 Claims, 7 Drawing Figures

TANDEM MASTER CYLINDER WITH INTEGRAL PROPORTIONING VALVE

CROSS REFERENCE TO RELATED APPLICATIONS

U.S. Pat. application Ser. No. 667,426, filed Mar. 16, 1976 is related to the instant application.

BACKGROUND OF THE INVENTION

As automotive brakes are successively applied harder and harder, a proportionately greater amount of vehicle load is shifted forward from the rear wheels to the front wheels. At high levels of braking, the shift may be great enough to cause rear wheel skidding to lock due to the lightened load on the rear wheels while failing to use the full stopping capability of the heavily loaded front wheels.

Brake proportioning valves have been developed which dynamically proportion the brake fluid pressure between front and rear brakes to achieve nearly maximum brake effectiveness at both low and high levels of fluid pressure. For example, in U.S. Pat. No. 3,771,836, a metering valve in the feed line to the front brakes of a vehicle initially reduces the amount of fluid pressure applied to the front brakes while allowing full pressure to the rear brakes. Then at higher fluid pressure the metering valve allows the full input fluid pressure to be applied to the front brakes. In Japanese Pat. application Publication No. 17617/1975, a proportioning valve in the feed line to the rear brakes initially admits full brake pressure to the rear brakes then restricts fluid pressure to the rear brakes at higher supply pressures. The net effect of the two above approaches is equivalent, namely shifting the balance of brake fluid pressures toward the front brakes for high braking levels.

Modern hydraulic brakes use tandem master cylinders in which a single mechanical pushrod input causes independent pistons in a single cylindrical bore to separately feed brake fluid pressure to front and rear wheels.

The applicant is aware of the following additional prior art patents which are hereby made of record: U.S. Pat. Nos. 3,926,476; 3,938,333; 3,252,740; and 3,462,200.

SUMMARY OF THE INVENTION

The instant invention teaches a tandem master brake cylinder having an integral proportioning valve interposed in the fluid pressure path between two pressure regions. A primary piston, directly receiving mechanical pushrod input force, produces fluid pressure in a primary pressure region for connection to the front brakes. A secondary piston is acted on by fluid pressure in an intermediate pressure region to produce fluid pressure in a secondary pressure region for connection to the rear brakes. At low force inputs, the output pressure generated by the primary piston acts undiminished through the intermediate pressure region on the input side of the secondary piston. The secondary piston thereupon generates a fluid pressure in the secondary pressure region substantially equal to the fluid pressure in the primary pressure region. Thus at low braking levels, front and rear brakes receive the same fluid pressure.

At a predetermined level of fluid pressure in the primary pressure region, called the split point, a valve member in the proportioning valve begins restricting increases in the fluid pressure transferred from the primary pressure region to the intermediate pressure region and thence to the input side of the secondary piston. Thereafter, for further increases in fluid pressure in the primary pressure region, increases in fluid pressure in the intermediate and secondary pressure regions are proportionately reduced.

In a first embodiment of the invention, pressure compounding in the primary pressure region causes incremental increases in pushrod forces above the split point to result in incrementally greater increases in pressure to the front brakes. Increases in the pressure to the rear brakes is incrementally smaller compared to the pushrod forces in this region. In a second embodiment of the invention incremental increases in pushrod forces above the split point result in normal increases in fluid pressure to the front brakes and incrementally smaller increases to the rear brakes.

DETAILED DESCRIPTION OF THE PREFERRED EMBODIMENT

Figure 1:
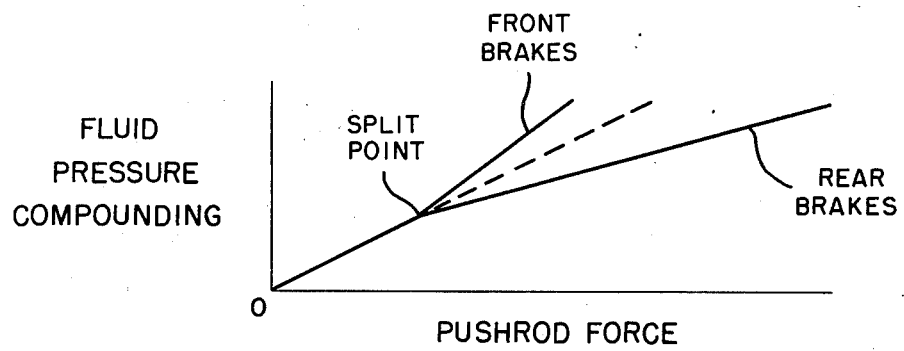
FIG. 1 shows the force and pressure relationships in a master cylinder according to a first embodiment of the invention.

FIG. 1 illustrates the force and pressure relationship of the first embodiment of the invention which provides pressure compounding in the primary pressure region. In the low region of pushrod force input from 0 to the split point, the fluid pressure delivered to front and rear brakes is equal. Beyond the split point, the pressure delivered to the front brakes bends upward from the dashed line which indicates the continuation of the low-force line. In addition, the pressure delivered to the rear brakes bends downward from the dashed line. The increase in front-brake pressure enables the front brakes to assume a greater shape of the braking task at high force inputs where forward load shift allows higher front-wheel braking torques to be used. The limitation on rear brake pressure in this region prevents skidding and the resultant control problems of the now-lightly loaded rear wheels.

Figure 2:
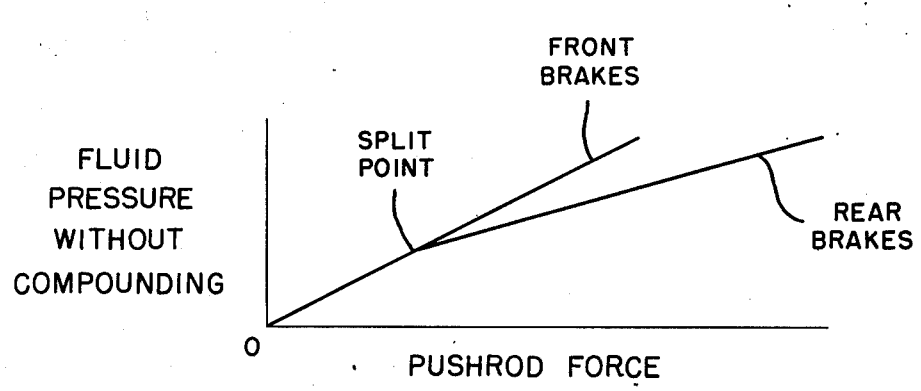
FIG. 2 shows the force and pressure relationships in a master cylinder according to a second embodiment of the invention.

FIG. 2 illustrates the force and pressure relationships in the second embodiment without pressure compounding. In the low region of pushrod-force input from 0 to the split point, the fluid pressures to the front and rear brakes remain equal as in the first embodiment. Beyond the split point, the pressure to the rear brakes bends downward from the front brake pressure line which follows the continuation of the low-force input line.

Figure 3:
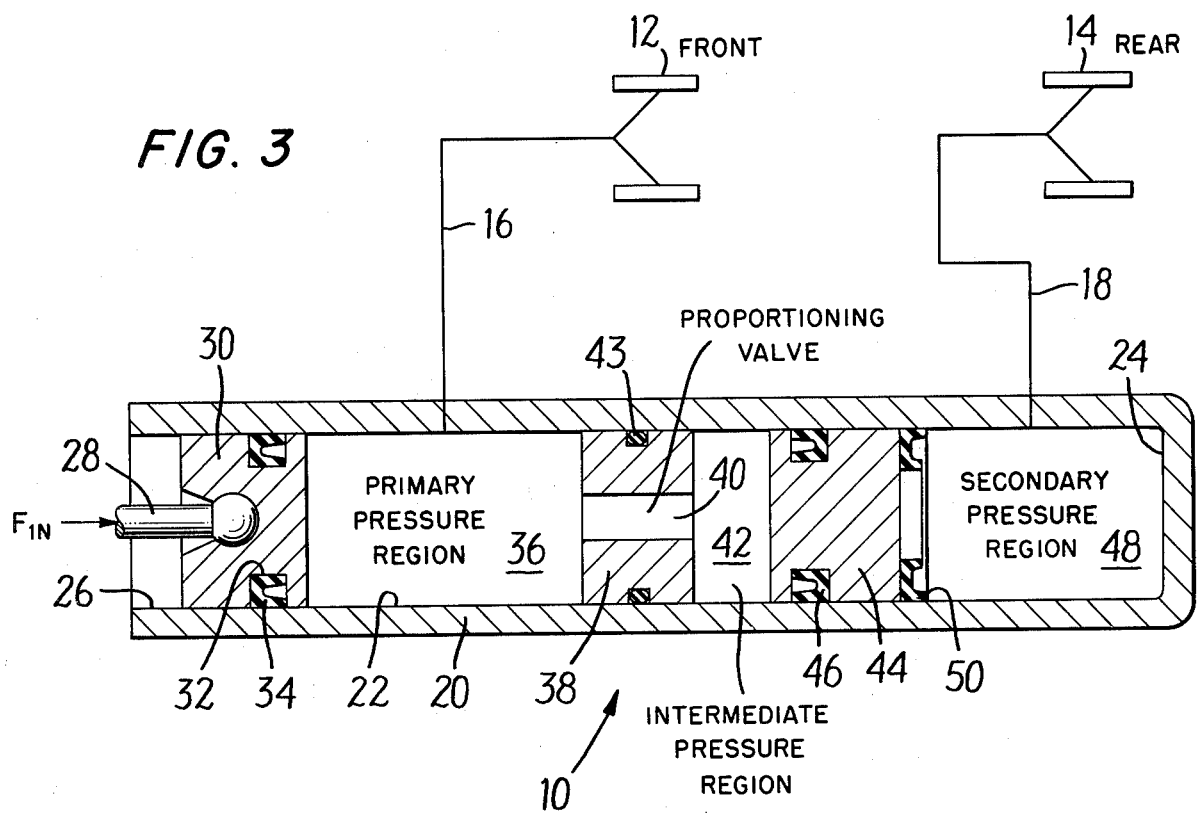
FIG. 3 shows a cross-section of a simplified tandem master cylinder containing a proportioning valve between primary and secondary pistons.

Referring now to FIG. 3, there is shown a simplified view of a tandem master cylinder 10 independently feeding brake fluid pressure to front wheels 12 and rear wheels 14 via conduits 16 and 18 respectively. The tandem master cylinder 10 is contained in a casing 20 having a cylindrical bore 22 therein. The cylindrical bore 22 has one closed end 24 and one open end 26. A mechanical pushrod 28 delivers longitudinal force $F_{in}$ to a primary piston 30 fitted into the cylindrical bore 22 near its open end 26. The primary piston 30 contains an annular groove 32 in its perimeter into which is fitted a seal 34. The region inside the primary piston 30 is the primary pressure region 36 from which conduit 16 feeds fluid pressure to the front brakes 12.

A barrier 38 containing a proportioning valve 40 separates the primary pressure region 36 from an intermediate pressure region 42. A gasket 43 seals the barrier 38 against fluid leakage axially past its perimeter. The proportioning valve 40 controls the fraction of the pressure in the primary pressure region 36 which is fed forward to the intermediate pressure region 42.

A secondary piston 44 having a peripheral seal 46 facing the intermediate pressure region 42 separates the intermediate pressure region 42 from a secondary pressure region 48. A flexible-lip seal 50 prevents leakage of fluid from the secondary pressure region 48 back past the secondary piston. Fluid pressure developed in the secondary pressure region 48 is connected by conduit 18 to the rear brakes 14. The barrier 38, although shown as a fixed separate item in this simplified drawing can be integrally formed with the primary or secondary pistons or in a moveable auxiliary piston in practical devices.

When force $F_{in}$ is applied to the pushrod 28, primary piston 30 is moved rightward. Due to the sealing action of seal 34, fluid pressure develops in primary pressure region 36 and is communicated via conduit 16 to the front brakes 12. Some of the pressure in the primary pressure region 36 is communicated through the proportioning valve 40 into the intermediate pressure region 42 where it acts against the area defined by the peripheral seal 46 on secondary piston 44 to force secondary piston 44 to the right. The flexible lip seal 50 causes fluid pressure to be developed in the secondary pressure region 48 and communicated through conduit 18 to the rear brakes 14 as a result of the rightward movement of the secondary piston 44. At low levels of pushrod force $F_{in}$, and the resulting low pressure in the primary pressure region 36, the proportioning valve 40 provides unrestricted transfer of the fluid pressure in the primary pressure region 36 to the intermediate pressure region 42. At levels of pushrod force $F_{in}$ above the split point, the incremental increase in pressure $\Delta P_i$ in the intermediate pressure region 42 is limited to a proportion R, less than one, of incremental increases $\Delta P_p$ in the primary pressure region 36. That is: $\Delta P_i = R \Delta P_p$ where $0 < R < 1$.

The pressure in the intermediate pressure region 42, applied to the input side of the secondary piston 44 produces approximately equivalent pressures in the secondary pressure region 48.

Figure 4:
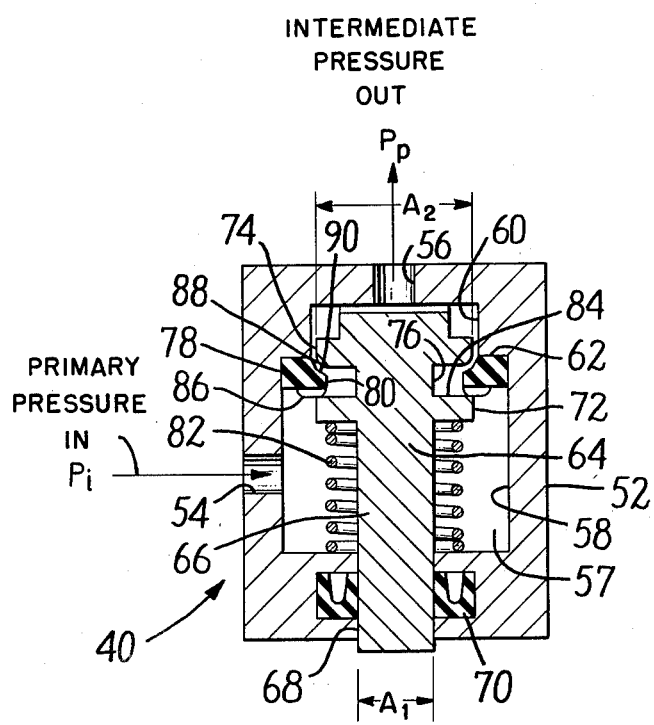
FIG. 4 shows a simplified cross section of a proportioning valve.

The performance of the proportioning valve 40 is described with reference to the simplified diagram in FIG. 4. A casing 52 receives primary pressure input at a pressure inlet 54 and delivers intermediate pressure at a pressure outlet 56. The casing 52 contains a stepped bore 57 having a larger diameter 58 and a smaller diameter 60 joined by an annular step 62. A moveable proportioning piston 64 is located within the stepped bore 57. A cylindrical shaft 66 extends outward through a circular opening 68 in the casing 52. A seal 70 prevents leakage past the shaft 66. An effective area $A_1$ is defined by the contact of the shaft 66 with the seal 70. The proportioning piston 64 has a lower flange 72 and an upper flange 74 separated by an annular groove 76. A resilient annular valve member 78 is located in the larger diameter 58 abutting the annular step 62. A lip 80 on the valve member 78 extends into the annular groove 76. A spring 82 having spring force $F_s$ normally biases the proportioning piston 64 upward. The upward travel of the proportioning piston 64 is mechanically limited by abutment against the upper end of the smaller diameter. The lower surface 86 of the valve member 78 contains grooves or channels, as indicated by the absence of cross-hatching in this area, in the region of contact with the lower flange 72. Thus, fluid pressure is not impeded in its flow from inlet 54 to outlet 56 when the proportioning piston 64 is in the position illustrated. The groove in piston 64 is provided to allow flow to passage 56.

The output primary pressure in the smaller diameter 60 acts on area $A_1$ to produce a downward force equal to $P_p A_1$. This downward force is opposed by the upward force $F_s$ of the spring 82. Thus for input pressures where $P_p A_1 < F_s$, the proportioning piston 64 remains biased in the upper position shown. At an input pressure where $P_p A_1 = F_s$, The proportioning piston 64 is shuttled downward. The lower lip 88 of the upper flange 74 is thereby brought into sealing contact with the upper sealing surface 90 of the valve member 78. This pressure defines the split point. The contact of the lower lip 88 with the sealing surface 90 defines an effective piston area $A_2$. The piston areas have the relationship $A_2 > A_1$.

A further increase in output pressure is resisted by the closed valve. However, the force $P_i(A_2 - A_1)$ tending to open the valve opposed to the force $P_p A_2$ tending to close the valve allows a metered increase in pressure $P_p$ into the intermediate pressure region until $$P_p = [P_i(A_2 - A_1) + F_s]/A_2$$

Thus, beyond the split point:

$$\Delta P_p = \alpha P_i[1 - (A_1/A_2)]$$

Figure 5:
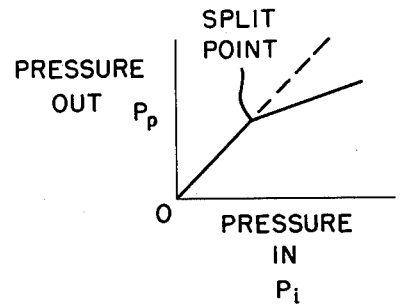
FIG. 5 shows the fluid pressure input-output relationship of a proportioning valve of the type shown in FIG. 3.

The intermediate pressure change $\Delta P_p$ is reduced by the fraction: $[1 - (A_1/A_2)]$. For example, if $A_2 = 3A_1/2$, $A_1/A_2 = \frac{2}{3}$ and $\Delta P_p = \frac{1}{3} \Delta P_i$. FIG. 5 illustrates the relationship between $P_p$ and $P_i$ with a change of three units of $P_i$ for each one unit of change in $P_p$.

Figure 6:
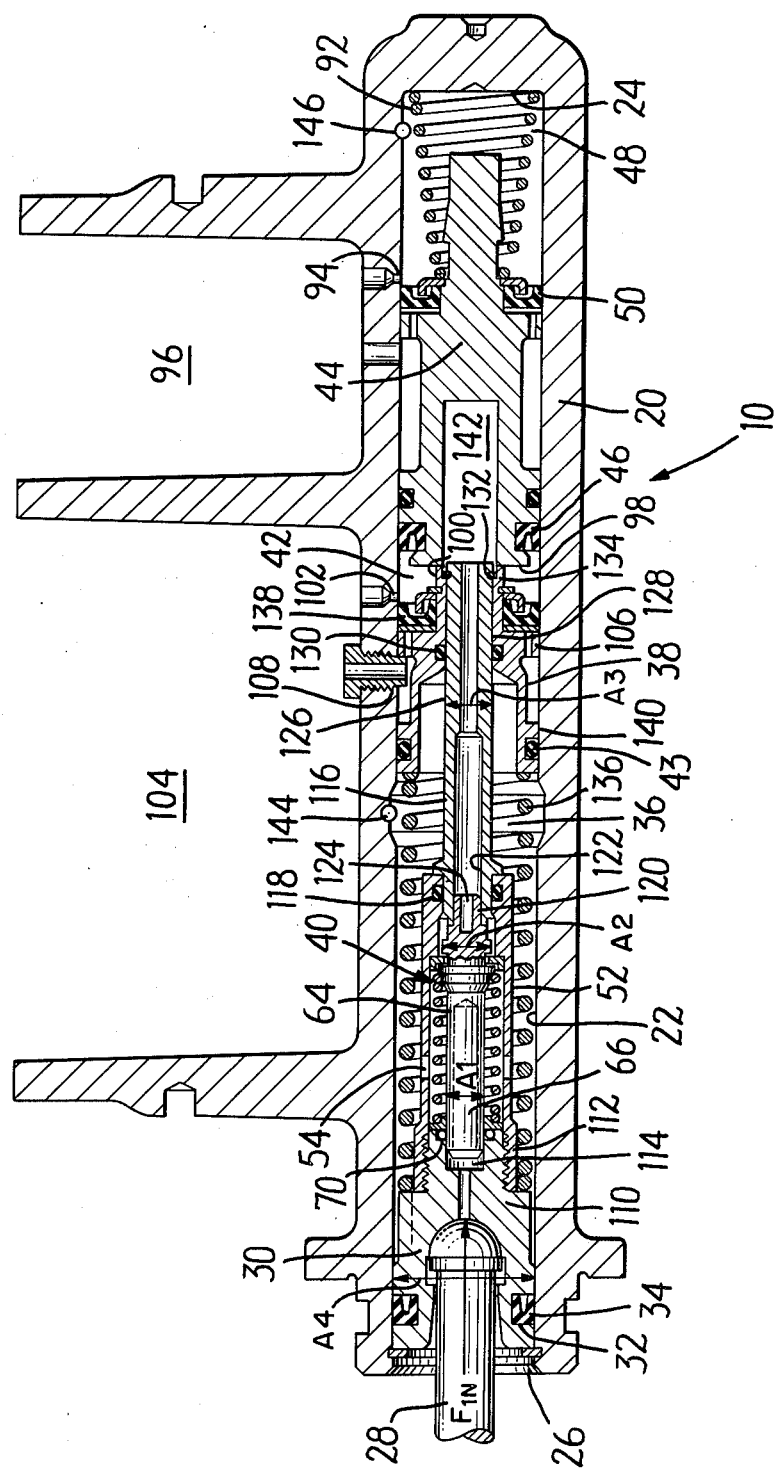
FIG. 6 shows an axial cross-sectional view of a first embodiment of the invention.

A first practical embodiment of the invention is shown in FIG. 6. Functionally corresponding elements from other drawings are given the same reference numerals. The operation of the tandem master cylinder 10 will be described only in the detail necessary to establish the novel features of the improvement.

The cylindrical bore 22 is occupied by the primary piston 30, having an area $A_4$, nearest the open end 26, the barrier 38, and the secondary piston 44 as in the simplified description. The barrier 38 in this practical embodiment is, in fact, an auxiliary compensator piston capable of limited axial motion as will be explained. The condition shown in the drawing is the brakes-off condition. The secondary piston 44 is biased leftward by the secondary return spring 92. A port hole 94, leading to an atmospheric pressure secondary fluid reservoir 96 enables equalization of fluid pressure in the secondary pressure region 48 to atmospheric pressure in order to relieve pressure buildup due to fluid heating or to replenish fluid lost in a braking action. The left end 98 of piston 44 is stopped by abutment with an annular flange 100 on the compensator piston 38. A port hole 102, leading to an atmospheric pressure primary fluid reservoir 104 enables pressure equalization in the intermediate pressure region 42. Leftward travel of the compensator piston 38 is stopped by abutment of a radially directed annular flange 106 with a hollow cylindrical bushing 108 which protrudes part way into the cylindrical bore 22.

The primary piston 30 has a cylindrical protrusion 110 having external threads 112 on its outer surface. A blind axial bore 114 in the primary piston 30 accepts the cylindrical shaft 66 of the proportioning piston 64. The blind axial bore 114 will normally be filled with compressible air in order to allow motion of the cylindrical shaft 66 into it without hydraulic lock. Alternatively, the axial bore 114 may extend completely through the primary piston 30, thus gaining access to external atmospheric air pressure. This alternative is not always attractive because any leakage of fluid past the seal 70 is lost outside the system. The proportioning valve casing 52 is threadably engaged with the threads 112 on the cylindrical protrusion 110. A hollow cylindrical guide shaft 116 is coaxially fixed to the end of the casing 52. A seal 118 prevents leakage of fluid between the guide shaft 116 and casing 52. A plurality of guide fingers 120 enter the axial bore 122 of the guide shaft 116. The guide fingers 120 are separated by a slot 124 which allows fluid pressure $P_p$ on the downstream side of the proportioning valve 40 to freely enter the axial bore 122. The cylindrical exterior 126 of the guide shaft 116 is fitted through an axial bore 128 which passes completely through the compensator piston 38. A seal 130 prevents fluid leakage past the exterior 126 of the guide shaft 116. The contact line between the seal 130 and the guide shaft 116 defines a piston area $A_3$. A snap ring 132 about the circumference of the guide shaft 116 bears leftward against a shoulder 134 on the axial bore 128. A primary return spring 136 provides axial bias force between the primary piston 30 and the compensator piston 38. The abutment of the snap ring 132 against the shoulder 134 limits the separation between the primary and compensator pistons 30, 38.

When the brake is first applied, the primary piston 30, compensator piston 38 and secondary piston 44 move rightward together due to the greater strength of primary return spring 136 compared to secondary return spring 92. Almost immediately, secondary port hole 94 is covered by flexible lip seal 50, and primary port hole 102 is covered by flexible lip seal 138. Fluid communication from the secondary and intermediate pressure regions 48, 42 to the secondary and primary reservoirs 96, 104 is cut off. Pressure is thus enabled to be developed in the three pressure regions. After a short rightward travel, abutment between a flange 140 on the compensator piston 38 and bushing 108 halts further rightward motion of the compensator piston 38. The primary piston 30 is enabled to continue travel after the compensator piston 38 has halted by the guide rod 116 sliding forward into a relief space 142 in the face of the secondary piston 44.

For low values of $F_{in}$, the fluid pressure developed by the primary piston 30 in the primary pressure region 36 is connected undiminished through the proportioning valve 40 and axial bore 122 into the intermediate pressure region 42. The pressure in the intermediate pressure region is effective over the area of the secondary piston 44 to force the secondary piston 44 rightward. This causes a pressure to be generated in the secondary pressure region 48 which is equal to the pressure in the intermediate pressure region 42. The pressure in the primary pressure region is delivered to the front brakes through a primary outlet 144. The pressure in the secondary pressure region 48 is connected to the rear brakes through a secondary outlet 146.

At values of $F_{in}$ above the split point, the proportioning valve 40 restricts the value of fluid pressure $P_p$ delivered to the intermediate pressure region 42. Consequently, the fluid pressure in the secondary pressure region 48 is similarly restricted.

Before the split point, the pressure in the primary pressure region is $P_i = F_{in}/A_4$. Past the split point, the primary piston 30 does not see a uniform resisting pressure on its full area, but instead, sees a reduced intermediate pressure $P_p$ over the area $A_3$ of the guide shaft 116. Thus, the pressure in the primary pressure region is increased for a given pushrod input $F_{in}$, and the primary pressure $= (F_{in} - P_p(A_3))/(A_4 - A_3)$.

The manner in which one of the pressure regions is enabled to continue supplying fluid pressure to its associated brakes during failure in the other pressure region as well as the manner in which fluid replenishment and compensation is accomplished in the two pressure regions will be recognized by one skilled in the art after reference to the drawings and therefore further description is omitted.

Figure 7:
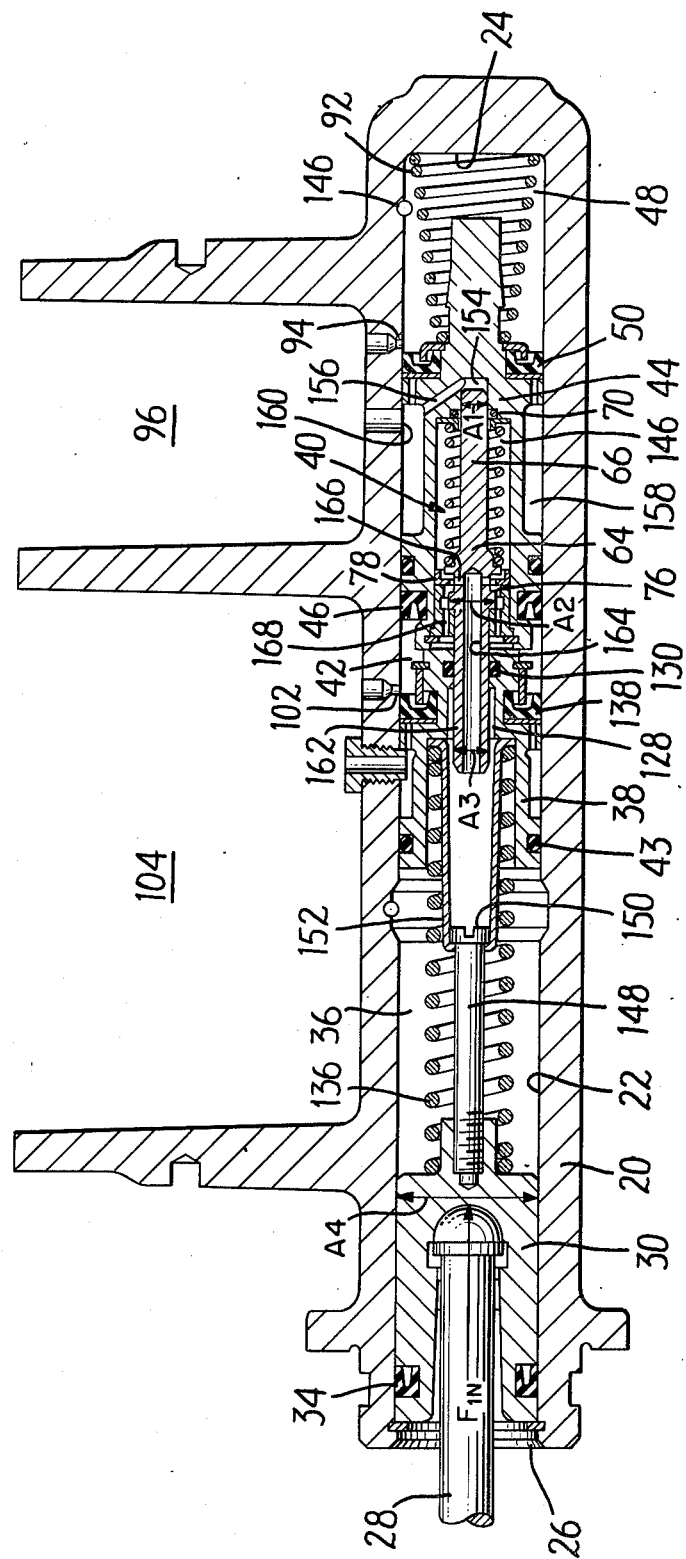
FIG. 7 shows an axial cross-sectional view of a second embodiment of the invention.

A second embodiment of the invention which omits compounding is shown in FIG. 7. The functions of the primary piston 30, compensator piston 38 and secondary piston 44 are essentially the same as previously described. The second embodiment differs from the first emboidment in that the location of the proportioning valve 40 has been transferred to a cavity 146 in the secondary piston 44. Telescoping mechanical connection between the primary piston 30 and the compensator piston 38 is provided by a bolt 148 having an enlarged head 150 attached to the primary piston 30 and a shackle 152 abutting the secondary piston 38, encircling the enlarged head 150, and caging spring 136.

The cylindrical shaft 66 of the proportioning valve 40 extends rightward into a blind axial bore 154 in the secondary piston 44. The seal 70 prevents leakage past the cylindrical shaft 66 while allowing axial motion. A relief channel 156 connects the blind axial bore 154 to a peripheral groove 158 in the secondary piston 44. The peripheral groove 158 is always exposed to the atmospheric pressure in the secondary fluid reservoir 96 by way of a secondary replenishment channel 160 connecting them. This exposure of the outer end of the cylindrical shaft 66 to the atmospheric-pressure reservoir 96 eliminates the problem experienced in the first embodiment of avoiding hydraulic lock in a closed blind bore. If leakage past the seal 70 should occur, the leaked fluid is merely added to the secondary fluid reservoir 96 and is not lost to the system.

The proportioning piston 64 has a cylindrical extension 162 which passes through the axial bore 128 in the compensator piston 38 and is sealed against fluid leakage by seal 130. The cylindrical extension 162 has an axial bore 164 extending therethrough and terminating in the vicinity of the annular groove 76 in the proportioning piston 64. A plurality of transverse bores 166 connects the axial bore 164 with the annular groove 76. The primary pressure input path, corresponding to the pressure inlet 54 in FIG. 4, is made up of the axial bore 164 and the transverse bores 166. A pressure outlet 168 leads leftward from the proportioning valve 40 to the intermediate pressure region 42.

At values of $F_{in}$ below the split point, the pressure in the primary pressure region 36, ($F_{in}/A_4$), is transmitted undiminished through axial bore 164, transverse bores 166 and pressure outlet 168 to the intermediate pressure region 42. The pressure in the intermediate pressure region 42 acts over the input side of the secondary piston 44 to produce a pressure in the secondary pressure region 48. Since the areas of both sides of the secondary piston are equal, and since there is free unrestricted flow from primary to intermediate regions, the fluid pressure in the secondary pressure region 48 is equal to the pressure in the primary pressure region 36 for values of $F_{in}$ below the split point.

Above the split point, the proportioning piston 64 is shuttled toward the right thus restricting the pressure delivered to the intermediate pressure region 42 and consequently restricting the pressure developed in the secondary pressure region 48. By summing the forces acting on the proportioning piston 64, a value of intermediate pressure $P_p$ is given by $P_p = [P_i(A_2 - A_3 - A_1) + F_s]/(A_2 - A_3)$ where all quantities are as previously defined. Similarly, by summing the forces acting on the secondary piston 44, a value of secondary output pressure $P_s$ is given by $P_s = [P_p(A_4 - A_3) + P_iA_1]/A_4$.

It will be understood that the claims are intended to cover all changes and modifications of the preferred embodiments of the invention, herein chosen for the purpose of illustration which do not constitute departures from the spirit and scope of the invention.

What is claimed is:

1. In a fluid brake system the improvement comprising:
   (a) a tandem brake master cylinder having;
   (b) a first, a second and an intermediate pressure region;
   (c) first conduit means for supplying fluid pressure from said first pressure region of the cylinder to a first set of brakes, said first conduit means providing a continuously open fluid communication between said first pressure region and said first set of brakes;
   (d) first piston means movable in said first pressure region of the cylinder for generating fluid pressure therein;
   (e) second conduit means for supplying fluid pressure from said second pressure region of the cylinder to a second set of brakes;
   (f) second piston means movable in said second region of the cylinder for generating fluid pressure therein on a first side of said second piston means;
   (g) proportioning valve means positioned between said first pressure region and a second side of said second piston means and forming between itself and said second side of said second piston means said intermediate pressure region;
   (h) said proportioning valve means at least in part controlling the relationship of fluid pressure in said first and intermediate pressure regions; and
   (i) the fluid pressure in said intermediate region urging said second piston means toward a position for generating fluid pressure in said second pressure region.

2. The structure specified in claim 1 which includes means for providing a seal between said first and intermediate fluid pressure regions and wherein said proportioning valve means maintains the fluid pressure in said intermediate pressure region equal to the pressure in said first pressure region over a first predetermined range of pressure in said first pressure region and further maintains a lower ratio of fluid pressure in said intermediate pressure region over a second predetermined range of pressure in said first pressure region.

3. The master cylinder recited in claim 2 wherein said proportioning valve means comprises:
   (a) a casing;
   (b) a moveable proportioning piston within said casing;
   (c) a seal in said casing sealingly engaged with a shaft on said proportioning piston, the line of engagement therebetween defining a first effective area;
   (d) a resilient annular valve member in said casing;
   (e) a lip on said proportioning piston adjacent to said annular valve member;
   (f) a spring normally urging said proportioning piston in a direction which disengages said lip from said annular valve member;
   (g) means for admitting fluid into said casing between said seal and said lip;
   (h) means in said casing for discharging the fluid from the region of said casing downstream from said lip;
   (i) means for permitting sliding motion of said shaft in said seal upon the occurrence of a first level of fluid pressure at said means for admitting, whereby said lip is moved into sealing abutment with said annular valve member; and
   (j) the line of contact between said lip and said annular valve member defining a second effective area larger than said first effective area.

4. The master cylinder recited in claim 2 further comprising:
   (a) said proportioning valve means being located within said first piston means;
   (b) means for supplying fluid to said proportioning valve means;
   (c) said means for supplying being at least one pressure inlet in said first piston means;
   (d) means for discharging fluid from said proportioning valve means;
   (e) said means for discharging being a guide shaft containing an axial bore;
   (f) said guide shaft being fixed and sealed to said first piston means; and
   (g) said guide shaft being slidingly and sealingly engaged in said means for providing a seal.

5. The master cylinder recited in claim 2 further comprising:
   (a) means for supplying fluid to said proportioning valve means; and
   (b) said means for supplying being a tube sealingly passing through said means for providing a seal.

6. The master cylinder recited in claim 1 wherein:
   (a) said proportioning valve means has a shaft;
   (b) said shaft being engaged in a hole; and
   (c) a seal about the perimeter of said shaft substantially prevents fluid pressure leakage through said hole past said shaft.

7. The master cylinder recited in claim 6 wherein said hole is blind and the part of said hole inside said seal is at least partly filled with air.

8. The master cylinder recited in claim 6 wherein a relief channel connects said hole with a fluid reservoir at approximately atmospheric pressure.

* * * * *